June 30, 1964   M. J. BERLYN   3,139,166
OVERSPEED PREVENTION DEVICE
Filed Feb. 8, 1960
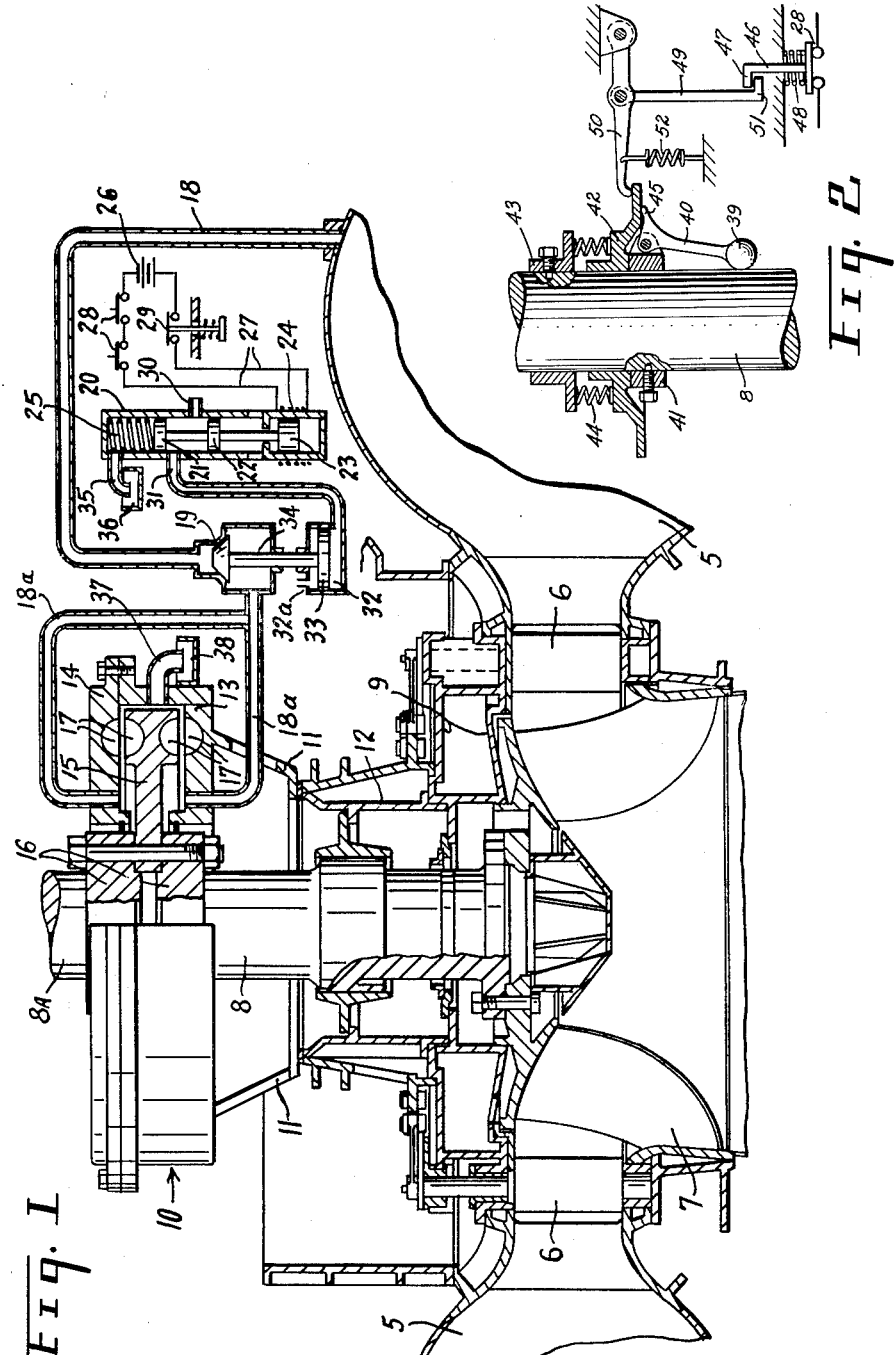
INVENTOR
MARTIN J. BERLYN
By Fetherstonhaugh & Co.
Attorneys

United States Patent Office
3,139,166
Patented June 30, 1964

3,139,166
OVERSPEED PREVENTION DEVICE
Martin John Berlyn, Montreal, Quebec, Canada, assignor to Dominion Engineering Works Limited, Montreal, Quebec, Canada
Filed Feb. 8, 1960, Ser. No. 7,247
17 Claims. (Cl. 192—3)

This invention relates to overspeed prevention devices and particularly to overspeed prevention devices for the control of hydraulic turbines, pumps, and similar units.

Many ways have been proposed, and some tried, for preventing overspeed of hydraulic turbines but none has proved attractive enough to come into general use. Some of the methods proposed include the following:

(a) Means separate from the normal governor for operating jet deflectors on impulse turbines.

(b) Braking vanes extended from the runner on Kaplan turbines (also applicable to Propeller turbines).

(c) Various means of cutting off the turbine water supply in the case of Kaplan, Propeller or Francis type turbines when the normal means, the wicket gates, fail to function.

Except for method (a) which is applicable only to hydraulic turbines of the Impulse type, none of the above methods are applicable to high head turbines where, because of water hammer considerations, the flow of water in the penstock cannot quickly be stopped. Methods of stopping the water flow quickly are expensive for large low head turbines. Some of the methods proposed are not generally considered reliable because they are not accessible for easy maintenance or because they stand for years without ever being operated.

Since overspeed of a hydro-turbine cannot take place in the absence of a supply of water under pressure, it is proposed to make use of some of this available water under pressure for the purpose of maintaining a load on the turbine, requiring the turbine to drive also a hydraulic brake or equivalent device, the rotor or rotors of which are permanently attached to the shaft coupling the turbine to the generator. At all rotational speeds within the normal governed range, the hydraulic brake is dry, and therefore has almost zero power demand. As soon as the shaft speed rises above a predetermined value, water under pressure is admitted to the hydraulic brake, which is of simple, non-modulating, design and so proportioned that, when supplied with water under pressure from the penstock, its power demand at the speed corresponding with maximum permissible turbine speed will be in excess of the power capability of the turbine at full gate when running at this speed.

The object of the invention is therefore to control overspeed in hydraulic turbines, pumps, etc. by means which will function automatically on failure of regular governor control.

A further object of the invention is to control overspeed in hydraulic turbines, etc. by increasing the power demand on the output side of the turbine by utilizing the pressure fluid at the input side of the turbine initially causing overspeed.

A further object of the invention is to provide means to control overspeed in hydraulic turbines which can be operated independently of the regular governor control.

A further object of the invention is to provide a hydraulic brake directly coupled to the hydraulic turbine or its shaft system, which will normally run dry and the operating fluid for which is obtained from the input side of the turbine when overspeed of the turbine develops.

A further object of the invention is to provide means whereby operation of the hydraulic brake is controlled by a valve which will automatically open to admit pressure fluid to the brake on failure of the speed control mechanism.

A further object of the invention is to provide a hydraulic brake directly coupled to the hydraulic turbine which will start to function as a brake when the hydraulic turbine exceeds a predetermined speed and which will prevent further excess of speed of the turbine over the predetermined value.

These and other objects will be apparent from the following detailed description of the invention and the accompanying drawings, in which:

FIG. 1 is a vertical sectional elevation of a typical Francis type turbine having a hydraulic brake installed on the generator shaft, and showing in diagrammatic form one means of controlling the admission of pressure fluid to the hydraulic brake from the input side of the turbine.

FIG. 2 is a part sectional view of a switch operating speed sensitive mechanism.

Referring to FIG. 1, the invention is shown as being applied to a typical Francis type turbine. However, it is to be understood that the invention can be applied to control overspeed in any other type of hydraulic turbine or pump in which overspeed is a factor to be taken into account.

In the Francis type turbine illustrated, the water driving the turbine enters through the turbine casing 5 and passes through the wicket gates 6 to effect rotation of the turbine runner 7 and the shaft 8 which in turn is connected to the generator shaft 8A. The turbine runner is enclosed on the top by the stationary head cover 9.

The overspeed prevention device is in the form of a hydraulic brake 10 mounted about the shaft 8 and supported by the pedestal 11 on the top of the annular structure 12, which in turn is supported on the top of the head cover 9. The hydraulic brake is of simple, non-modulating design and so proportioned that, when supplied with water under pressure from the casing 5, its power demand at the speed corresponding with maximum permissible turbine speed will be in excess of the power capability of the turbine at full gate when running at this speed.

The hydraulic brake 10 is here shown as having a lower stator 13 and an upper stator 14, mounted on the pedestal 11 secured to the annular structure 12 and the head cover 9. The rotor 15 of the brake is secured between the flanges 16 of shafts 8 and 8A. Stators 13 and 14 and rotor 15 are provided with vanes 17 in known manner.

The fluid supply for the hydraulic brake 10 is obtained from the turbine casing 5 through the pipe connection 18 and the flow of fluid through the connection 18 is controlled by a valve 19. Under normal operating conditions this valve 19 is kept in the closed position and the hydraulic brake 10 rotates in air. However, under overspeed conditions the valve 19 is opened allowing water under pressure to flow into the hydraulic brake through the branch connections 18a.

It is desirable that the overspeed preventing device should be automatically resetting in order that it shall not be possible for the turbine to suffer runaway as a consequence to the failure of operating personnel to reset the device properly after it has performed a cycle of operation. A suitable overspeed control mechanism in which failure of oil pressure or electrical power supply would cause application of the hydraulic brake 10, is shown diagrammatically in FIG. 1. It is to be noted that this is a "Fail Safe" arrangement. This overspeed control mechanism comprises a piston valve housing 20 in which a two-land pilot valve 21-22 is urged in one direction by means of the solenoid armature 23 when the solenoid coil 24 is energized and is urged in the other direction by the spring 25. Power for the solenoid coil 24 is furnished by the battery 26 through the leads 27. Two or more speed sensitive switches 28 in series with each other are of the normally closed type maintaining the pilot valve 21-22 in the raised position as shown in FIG. 1, since the upward force exerted by the solenoid armature 23 is greater than the downward force exerted by the spring 25. A test switch 29 between the battery 26 and the solenoid coil 24 provides for the testing of the control of the hydraulic brake 10 independently of the switches 28.

The speed sensitive switches 28 are operated by a speed sensor mechanism attached directly to the shaft 8. This speed sensor mechanism may be of any well known type normally employed on hydraulic turbines.

In the present instance we have shown in FIG. 2, merely by way of example, a conventional type of mechanism including centrifugal weight 39 and lever 40 which is pivotally mounted on lower fixed collar 41, fixed and mounted on shaft 8. Bearing collar 42 is slidably mounted to rotate with shaft 8 between lower fixed collar 41 and upper fixed collar 43 and is urged downwardly into contact with lower fixed collar 41 by springs 44. Lobe 45 on lever 40 is positioned to force bearing collar 42 upwards against springs 44, when centrifugal weight 39 moves outwards under the influence of centrifugal force.

One of the pressure switches 28 is shown having an opening link 46 with a hooked end portion 47, and a closing spring 48. Hooked link 49 is pivotally mounted at one end on lifting lever 50, with the hooked end 51 positioned to operatively engage the hooked end portion 47 of opening link 46.

One end of lifting lever 50 is pivotally mounted on the stationary machine structure and the other end bears on the rotating bearing collar 42 and is held in this position by spring 52.

Centrifugal weight 39 is designed to move outwards when the revolutions per minute of shaft 8 reach a maximum, representing overspeed. In the operation of this mechanism therefore, centrifugal weight 39 moves outward, raising bearing collar 42, thereby raising lifting lever 50 and opening pressure switch 28. When the overspeed condition has passed bearing collar 42 is returned to its original position under the pressure of springs 44 and pressure switch 28 is closed under pressure of spring 48.

The valve 19 is normally maintained in the raised position shown in FIG. 1 by means of a supply of oil or other fluid under pressure from a suitable source, such as the governor oil. The oil under pressure is fed to the pilot valve housing 20 through the inlet 30. So long as the pilot valve 21-22 is maintained in the raised position by the solenoid armature 23, oil pressure is communicated by way of outlet 31 of the pilot valve housing 20 into the cylinder 32 where it will force the piston 33 upwards. The upper side of the piston 33 is vented to atmosphere through the vent 32a. This piston 33 is directly connected with the valve 19 by means of the shaft 34. The valve 19 is therefore maintained closed by oil pressure under the piston 33, preventing flow of water from casing 5 to hydraulic brake 10 through the pipe connection 18. The opening of one or all of the speed sensitive switches 28 due to overspeeding of the shaft 8 will cut the supply of current to the solenoid coil 24 allowing spring 25 to force the pilot valve 21-22 downwards. As the land 21 of the pilot valve drops below the outlet 31 in the pilot valve housing 20, the oil in the cylinder 32 is allowed to drain back into the pilot valve housing and through the outlet 35 into the sump 36. Similar operation of the valve 19 is effected by opening of the test switch 29 or by failure of the supply of pressure fluid to the cylinder 32 by causes other than operation of the switches 28 and 29.

Drainage of the hydraulic brake 10 is effected through the water discharge openings 37 into the sump 38.

In the operation of the above described invention the hydraulic brake 10 will be brought into action immediately the switches 28 are opened due to overspeed of the turbine. The hydraulic brake, when energized, will immediately apply a power demand on the turbine which will keep its speed from advancing above the speed normally controlled by the governor. The chances of failure of the mechanism controlling the hydraulic brake to operate as designed are almost non-existent. Sticking of the valve 19 or of the two or more speed switches 28 simultaneously could cause failure, but these are all simple devices which may economically be heavily overdesigned for safety. Furthermore, such failure would have to occur simultaneously with failure of the usual governing means and the periodic operation of the test switch 29 can be used as a check to test if the control of the hydraulic brake is in satisfactory operating condition. The speed switches as well as the rest of the device may be tested by allowing overspeed of the turbine, under governor control.

What I claim is:

1. The combination with a prime mover of an automatic overspeed control means comprising a normally inoperative hydraulic brake connected to the prime mover to impose a braking action on the prime mover in the operative condition of said brake and a speed sensitive brake controlling means operable by the prime mover, only when the speed of the latter exceeds a predetermined value, to supply pressure fluid to the brake to render the brake operable to apply a braking action to the prime mover, said speed sensitive brake controlling means includes a source of pressure fluid, a normally closed valve through which pressure fluid is delivered from said source to brake in the open position of said valve and valve actuating means operatively connected to the prime mover shaft and functioning automatically to effect opening of said valve when the speed of the prime mover exceeds a predetermined value.

2. The combination with a prime mover of an automatic overspeed control means comprising a normally inoperative hydraulic brake connected to the prime mover to impose a braking action on the prime mover in the operative condition of the brake and a speed sensitive controlling means operable by the prime mover, only when the speed of the latter exceeds a predetermined value, to supply pressure fluid to the brake to render the latter operable to apply a braking action to the prime mover, said speed sensitive controlling means including a source of pressure fluid, a normally closed brake valve through which pressure fluid is delivered from said source to said brake in the open position of said brake valve and valve actuating means operatively connected to the prime mover shaft and functioning automatically to cause said brake valve to open when the speed of the prime mover exceeds a predetermined value, said valve actuating means including a cylinder and piston device controlling the closing and opening of said brake valve, a pilot valve through which pressure fluid is routed to and from said cylinder and piston device and means opperable by the prime mover to automatically position the pilot valve to effect closing of the brake valve when the speed of the prime mover is at or below a predetermined value and to effect opening of the brake valve when the speed of the prime mover exceeds said predetermined value.

3. The combination as set forth in claim 2, in which the last mentioned means includes a solenoid for controlling the positioning of said pilot valve and speed sensitive switches connected in circuit with said solenoid and with a source of current.

4. The combination with a prime mover of an automatic overspeed control means comprising a normally inoperative brake connected to the prime mover and operable to impose a speed-retarding braking action on the prime mover only when the speed of the prime mover reaches a predetermined maximum value and a speed sensitive brake controlling means operable by the prime mover when the speed of the latter reaches said predetermined maximum value to render the brake operable to prevent excessive over-speeding of the prime mover, said brake being designed with braking power proportioned to prime mover power so that the prime mover is incapable of driving the brake at excessive speeds above a safe maximum limit for the prime mover and the machine which it drives.

5. The combination as set forth in claim 4, in which the brake is a fluid brake designed so that when the brake is filled with pressure fluid in the operative condition thereof its capacity to absorb power rises more rapidly with increasing speed than the power output of the prime mover.

6. The combination as set forth in claim 4, in which the brake is a hydraulic brake designed so that when the brake is filled with water in the operative condition thereof its capacity to absorb power rises more rapidly with increasing speed than the power output of the prime mover.

7. The combination with a pressure fluid actuated prime mover of an automatic overspeed control means comprising a normally inoperative fluid brake connected to the prime mover and operable to impose a speed retarding braking action on the prime mover only when the speed of the prime mover reaches a predetermined maximum value and a speed sensitive brake controlling means operable by the prime mover when the speed of the latter reaches said predetermined maximum value to supply fluid to the brake to render the brake operable to prevent excessive over-speeding of the prime mover, said brake being designed so that when it is filled with fluid in the operative condition thereof its capacity to absorb power rises more rapidly with increasing speed than the power output of the prime mover.

8. The combination as set forth in claim 7, in which the speed sensitive brake controlling means is operable to supply operating fluid to the brake only when operating fluid is also being supplied to the prime mover.

9. The combination as set forth in claim 7, in which the speed sensitive brake controlling means functions automatically to drain operating fluid from the brake when the speed of the prime mover decreases to a value below the value at which the brake is put into operation.

10. The combination as set forth in claim 7, in which the prime mover and the brake are supplied with pressure fluid from a common source and in which the speed sensitive brake controlling means includes flow control valves through which operating fluid is supplied to the brake only when operating fluid is also being supplied to the prime mover and the latter has attained a speed above said predetermined maximum value, said control means being further characterized in that it operates automatically to drain the operating fluid from the brake when the speed of the prime mover drops below the value at which the brake is put into operation.

11. The combination with a hydraulic turbine including a rotatably mounted shaft, a turbine runner fixed to said shaft and a runner-enclosing casing through which water under pressure is delivered to the runner to drive said runner and said shaft, of a normally inoperative hydraulic brake including a rotor element mounted on and secured to the turbine shaft to rotate therewith and a stator casing housing said rotor element and a speed sensitive brake controlling means operable by the prime mover only when the speed of the latter reaches a predetermined maximum value to render the brake operable to prevent excessive overspeeding of the prime mover, said sensitive brake controlling means including a normally closed brake valve and conduit means through which water under pressure is delivered from said turbine casing to said brake in the open position of said valve and turbine-controlled valve actuating means operatively connected to the turbine shaft and functioning automatically to effect opening of said brake valve only when the speed of the prime mover exceeds a predetermined value.

12. The combination as set forth in claim 11, including means for effecting the reclosing of said valve when the speed of the turbine drops below the brake operating speed and means for draining water from the brake when said valve is closed.

13. The combination with a hydraulic turbine including a rotatably mounted shaft, a turbine runner fixed to said shaft and a runner-enclosing casing through which water under pressure is delivered to the runner to drive said runner and said shaft, of a normally inoperative hydraulic brake including a rotor element mounted on and secured to the turbine shaft to rotate therewith and a stator casing housing said rotor element and a speed sensitive brake controlling means operable by the prime mover only when the speed of the latter reaches a predetermined maximum value to render the brake operable to prevent excessive overspeeding of the prime mover, said sensitive brake controlling means including a normally closed brake valve and conduit means through which water under pressure is delivered from said turbine casing to said brake in the open position of said valve and valve actuating means operatively connected to the turbine shaft and functioning automatically to cause said brake valve to open when the speed of the prime mover exceeds a predetermined value, said valve actuating means including a cylinder and piston device controlling the closing and opening of said brake valve, a pilot valve through which pressure fluid is routed to and from said cylinder and piston device and means operable by the turbine to automatically position the pilot valve to effect closing of the brake valve when the speed of the prime mover is at or below a predetermined value and to effect opening of the brake valve when the speed of the prime mover exceeds said predetermined value.

14. The combination as set forth in claim 13, in which the last mentioned means includes a solenoid for controlling the positioning of said pilot valve and speed sensitive switches in circuit with said solenoid and with a source of current.

15. The combination as set forth in claim 13, including means, independent of the brake valve, for draining operating fluid from the brake in the closed position of the brake valve.

16. The combination with the shaft and runner of a hydraulic turbine of an automatic overspeed control means comprising a normally inoperative hydraulic brake connected to the turbine runner to impose a braking action thereon in the operative condition of the brake, a normally closed valve through which pressure fluid is delivered from the input side of the turbine to said brake in the open position of said valve and valve actuating means operatively connected to the turbine shaft and functioning automatically to cause said valve to open when the speed of the turbine runner exceeds a predetermined value.

17. The combination as set forth in claim 16, in which the hydraulic brake includes a stator casing and a rotor housed in said casing and connected to the turbine to be rotated thereby.

References Cited in the file of this patent
UNITED STATES PATENTS

| | | |
|---|---|---|
| 1,212,311 | Bailey | Jan. 16, 1917 |
| 2,850,122 | Alishouse | Sept. 2, 1958 |
| 2,946,416 | Snoy | July 26, 1960 |
| 2,990,919 | Christenson et al. | July 4, 1961 |